United States Patent
Doyle et al.

(10) Patent No.: US 9,654,002 B2
(45) Date of Patent: May 16, 2017

(54) CIRCUITS AND METHODS PROVIDING DEAD TIME ADJUSTMENT AT A SYNCHRONOUS BUCK CONVERTER

(71) Applicant: QUALCOMM Incorporated, San Diego, CA (US)

(72) Inventors: James Thomas Doyle, Carlsbad, CA (US); Farsheed Mahmoudi, San Diego, CA (US); Chuang Zhang, Fort Collins, CO (US); Zhengming Fu, San Diego, CA (US); Sassan Shahrokhinia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 14/918,893

(22) Filed: Oct. 21, 2015

(65) Prior Publication Data

US 2016/0118893 A1    Apr. 28, 2016

Related U.S. Application Data

(60) Provisional application No. 62/067,906, filed on Oct. 23, 2014.

(51) Int. Cl.
H02J 3/12 (2006.01)
G05F 1/00 (2006.01)
(Continued)

(52) U.S. Cl.
CPC .............. H02M 3/158 (2013.01); H02M 1/38 (2013.01); H02M 3/157 (2013.01);
(Continued)

(58) Field of Classification Search
CPC .......... G05F 1/461; G05F 1/562; G05F 1/565; G05F 1/56; G05F 1/575
(Continued)

(56) References Cited

U.S. PATENT DOCUMENTS

| 4,967,332 A | 10/1990 | Claydon et al. |
| 6,958,592 B2 | 10/2005 | Chapuis |

(Continued)

FOREIGN PATENT DOCUMENTS

| WO | WO-2005011118 A2 | 2/2005 |
| WO | WO-2006015000 A2 | 2/2006 |

OTHER PUBLICATIONS

Hashim A., et al., "Fast Transient Digitally Controlled Buck Regulator With Inductor Current Slew Rate Boost," IEEE International Symposium on Circuits and Systems (ISCAS), May 2013, 68 pages.
(Continued)

*Primary Examiner* — Nguyen Tran
*Assistant Examiner* — Gary Nash
(74) *Attorney, Agent, or Firm* — Haynes and Boone, LLP

(57) ABSTRACT

An apparatus and method are disclosed for efficiently using power at a voltage regulator, such as a synchronous buck converter. The synchronous buck converter includes a first switch and a second switch operated by a first control signal and a second control signal, respectively, where the first and second control signals have a corresponding phase difference. A logic circuit measures a duty cycle of an input pulse width modulated (PWM) signal against iterative changes of the phase difference between the first control signal and the second control signal. The logic circuit selects a phase difference corresponding to a minimum value of the PWM signal, thereby optimizing dead time at the synchronous buck converter. The logic circuit may include a Digital Pulse Width Modulator.

30 Claims, 7 Drawing Sheets

(51) Int. Cl.
*H02M 3/158* (2006.01)
*H02M 1/38* (2007.01)
*H02M 3/157* (2006.01)
*H02M 1/00* (2006.01)

(52) U.S. Cl.
CPC .............. *H02M 2001/0012* (2013.01); *H02M 2001/0048* (2013.01); *Y02B 70/1491* (2013.01)

(58) Field of Classification Search
USPC ................ 323/241–243, 246, 266, 274–276, 323/282–286
See application file for complete search history.

(56) References Cited

U.S. PATENT DOCUMENTS

| | | | |
|---|---|---|---|
| 7,098,640 B2 | 8/2006 | Brown | |
| 7,193,401 B1* | 3/2007 | Hasegawa | H02M 3/1588 323/224 |
| 7,554,372 B1 | 6/2009 | Wong | |
| 7,825,642 B1 | 11/2010 | Young et al. | |
| 7,868,597 B2 | 1/2011 | Dequina | |
| 8,036,762 B1 | 10/2011 | Young et al. | |
| 8,436,594 B2* | 5/2013 | Fu | H02M 1/38 323/271 |
| 8,902,617 B2 | 12/2014 | Wahledow et al. | |
| 2006/0041766 A1 | 2/2006 | Adachi | |
| 2006/0152204 A1 | 7/2006 | Maksimovic et al. | |
| 2008/0079408 A1* | 4/2008 | Hasegawa | H02M 3/1588 323/283 |
| 2009/0146630 A1* | 6/2009 | Naka | H02M 1/38 323/283 |
| 2011/0133712 A1* | 6/2011 | Sasaki | H02M 3/157 323/283 |
| 2012/0062201 A1* | 3/2012 | Hachiya | H02M 3/1588 323/283 |
| 2012/0242314 A1* | 9/2012 | Namekawa | H02M 3/157 323/283 |
| 2013/0147409 A1 | 6/2013 | Song et al. | |

OTHER PUBLICATIONS

Li P., et al., "A DLL Based Multiphase Hysteretic DC-DC Converter", 8th International Symposium on Quality Electronic Design, ISQED '07, Mar. 26-28, 2007, pp. 98-101.

Mohamood F., et al., "A Floorplan-Aware Dynamic Inductive Noise Controller for Reliable Processor Design", School of Electrical and Computer Engineering, Georgia Tech., 23 slides.

Stinson J., "Lecture 11—Low Power and Power Efficient Circuits", Intel Corporation, 19 Pages.

International Search Report and Written Opinion—PCT/US2015/056984—ISA/EPO—Feb. 2, 2016.

Second Written Opinion from International Application No. PCT/US2015/056984, mailed Oct. 20, 2016, 6 pages.

* cited by examiner

CIRCUITS AND METHODS PROVIDING DEAD TIME ADJUSTMENT AT A SYNCHRONOUS BUCK CONVERTER

CROSS REFERENCE TO RELATED APPLICATIONS

The present application claims priority to and the benefit of the U.S. Provisional Patent Application No. 62/067,906, filed Oct. 23, 2014, which is hereby incorporated by reference in its entirety.

TECHNICAL FIELD

This application relates to voltage converters and, more specifically, to feedback control of synchronous buck converters.

DETAILED DESCRIPTION

Disclosed herein are embodiments of a circuit and a method for efficient use of power in a voltage regulator. In one embodiment, a synchronous buck converter is included in a feedback loop, where the output voltage of the synchronous buck converter is fed back to a pulse width modulation (PWM) controller. The PWM controller uses the voltage output feedback to adjust a duty cycle of a PWM signal that affects the operation of the synchronous buck converter. The feedback loop holds the voltage output nearly constant by adjusting the PWM signal.

The synchronous buck converter receives two control signals at its switches, where the two control signals have a phase difference that defines a dead time of the switches. Another feedback loop selects a desired value for the phase difference so that dead time in the synchronous buck converter is optimized.

Figure 1:
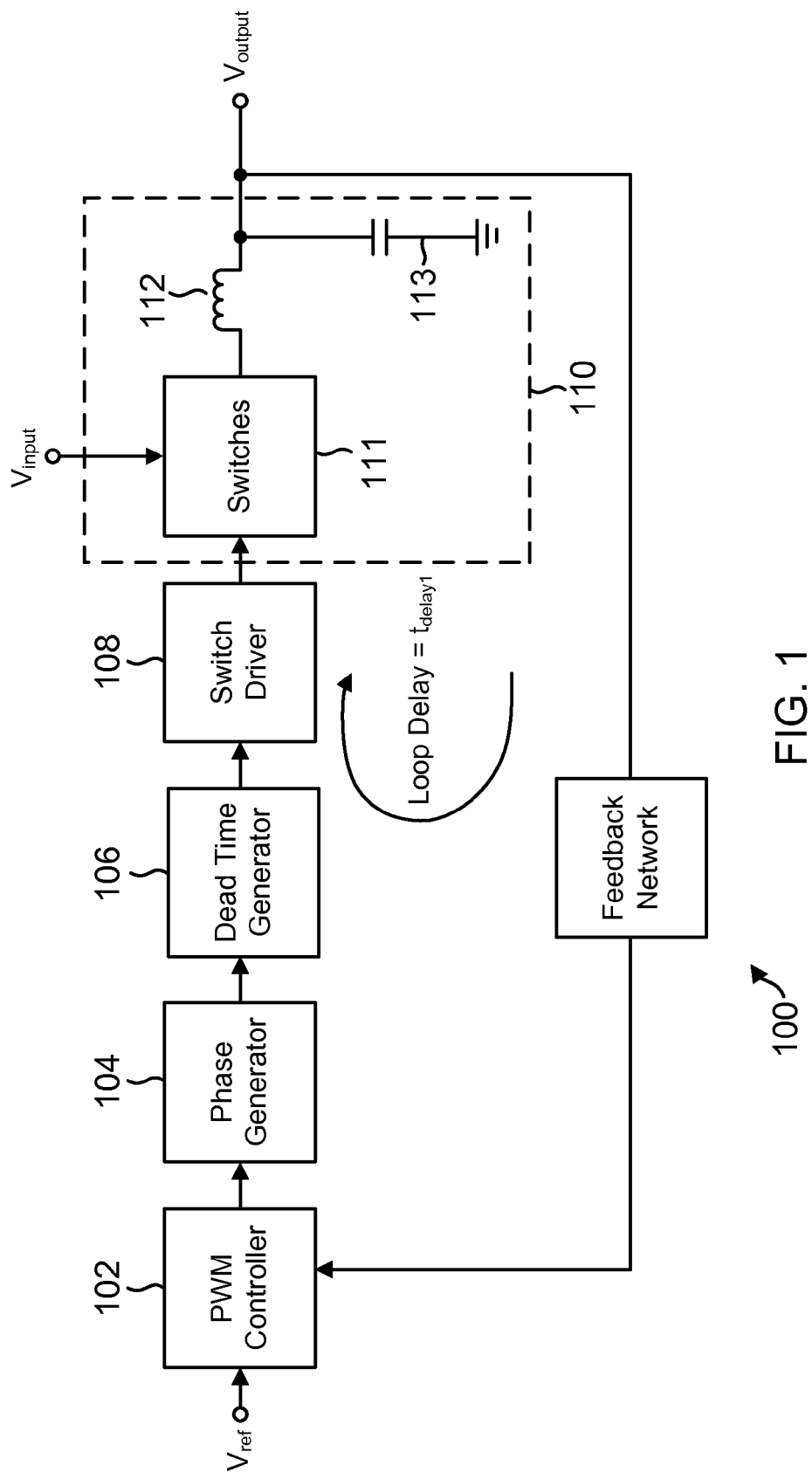
FIG. 1 is an architectural diagram illustrating an example feedback loop for providing a constant, or nearly constant, output voltage.

FIG. 1 is an architectural diagram illustrating an example feedback loop for providing a constant, or nearly constant, Voutput. PWM controller 102 receives a reference voltage (Vref) and a feedback signal providing a value of Voutput and outputs a PWM signal in response to a difference between Vref and Voutput. The PWM controller 102 modulates the PWM signal by adjusting the duty cycle of the PWM signal. In general, a larger duty cycle of the PWM signal increases a voltage at the output of synchronous buck converter 110, and a smaller duty cycle of the PWM signal decreases a voltage at the output of synchronous buck converter 110. In this way, PWM controller 102 continually adjusts the duty cycle of the PWM signal to keep Voutput nearly constant.

Phase generator 104 receives the PWM signal from PWM controller 102 and processes the PWM signal by adjusting its phase or producing multiple different signals with different phases. For instance, phase generator 104 may produce different signals for coupled inverters or may produce different signals for a multi-phase buck converter. However, for ease of illustration, operation of phase generator 104 will not be discussed further herein, and this example assumes that dead time generator 106 receives the PWM signal or a signal very similar to the PWM signal.

Dead time generator 106 receives the PWM signal and outputs two control signals. As explained in more detail below, synchronous buck converter 110 includes two switches 111, and each one of the switches corresponds to a respective control signal produced by dead time generator 106. Also, as explained in more detail below, a phase difference between the first control signal and the second control signal affects the timing of operation of the switches 111, thereby defining a dead time in synchronous buck converter 110. Various embodiments described herein adjust the phase difference between the first control signal and a second control signal to a desired value to save energy at synchronous buck converter 110. Operation of dead time generator 106 and selection of a desired dead time are also described in more detail below with respect to FIGS. 3 and 5.

The two control signals are output from dead time generator 106 and received by switch driver 108. Switch driver 108 includes buffer drivers, which increase a power of each of the control signals in order to provide adequate power to turn on and off the switches 111 within buck converter 110.

Buck converter 110 receives Vinput, which in some embodiments is a power signal from a power rail on a semiconductor die. In other embodiments, Vinput may include power from a battery or other voltage source. Switches 111 open and close according to the control signals from switch driver 108. The operation of switches 111, inductor 112, and capacitor 113 provide a steady output voltage at Voutput. Synchronous buck converter 110 may include any synchronous buck converter now known or later developed and may include in some embodiments a conventional synchronous buck converter 110 that reduces the voltage from Vinput according to a duty cycle of the received control signals. If Voutput drops or increases, the change in voltage is seen by PWM controller 102, which adjusts a duty cycle of the PWM signal to return the voltage at Voutput to a desired level. Similarly, $I^2R$ power losses within the system 100 of FIG. 1 affect the operation of the feedback loop. Specifically, $I^2R$ losses in the system components cause PWM controller 102 to increase the duty cycle of the PWM signal enough to account for those losses.

Figure 5:
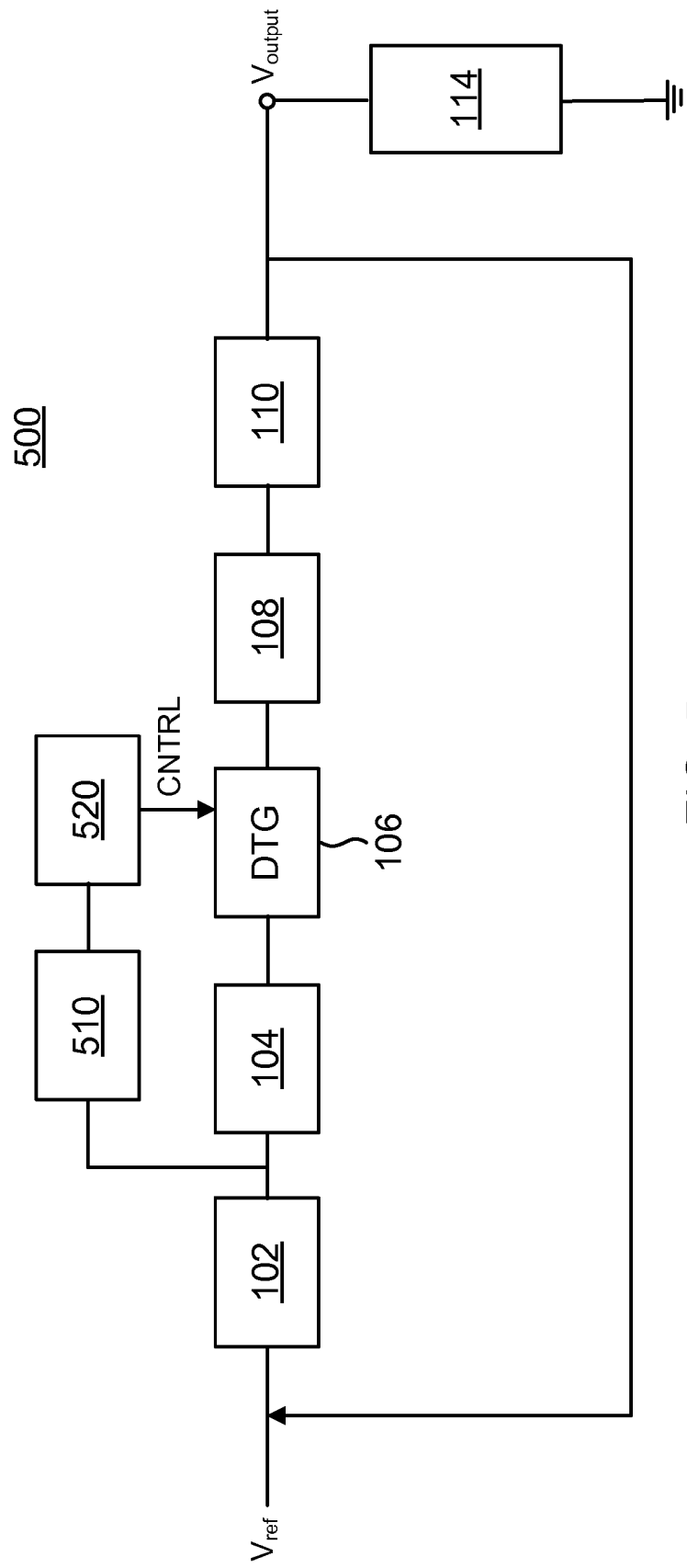
FIG. 5 is an illustration of an example system for setting dead time at a desired value, according to one embodiment.

FIG. 1 does not show a control loop for optimizing the dead time at dead time generator 106. However, FIG. 1 shows a feedback loop for a voltage controller in which a dead time feedback loop may be added. FIG. 5, described further below, shows a second control loop added to the feedback loop of FIG. 1 so that the dead time at buck converter 110 is set to a desired value.

Figure 2:
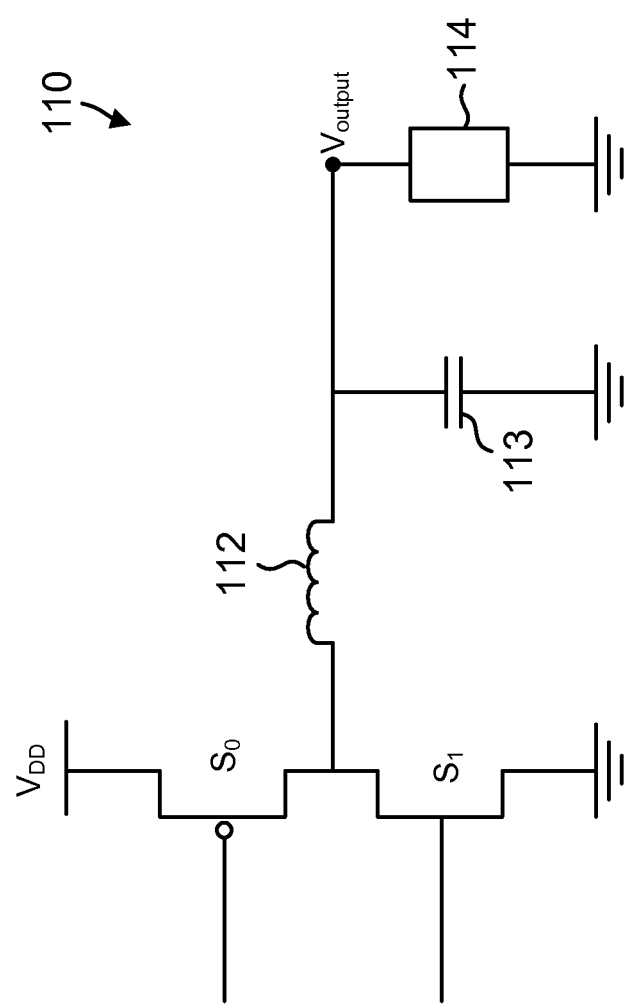
FIG. 2 is an illustration of an exemplary synchronous buck converter that can be employed in any of the example architectures herein, according to some embodiments.

FIG. 2 is an illustration of an exemplary synchronous buck converter that can be used as buck converter 110 in the embodiment of FIG. 1. In FIG. 2, Vinput is shown as VDD, and load 114 is shown between Voutput and ground. In system on chip (SOC) embodiments, load 114 may include, for example, a processing core, a modem, or the like. However, the scope of embodiments is not limited to SOCs.

FIG. 2 illustrates two switches, S0 and S1, which receive the first and second control signals from dead time generator 106 of FIG. 1. Synchronous buck converters, such as buck converter 110, may experience a phenomenon called "shoot-through" which includes a short circuit condition where both S0 and S1 conduct current for an amount of time, thereby allowing VDD to couple directly to ground. Shoot-through is generally undesirable because it is a power loss, and conventional synchronous buck converter algorithms seek to reduce or eliminate shoot-through. On the other hand, if both S0 and S1 are off at the same time inductor 112 may pull current from ground through the body of S1 (a body diode power loss), which is also a power loss.

Figure 3:
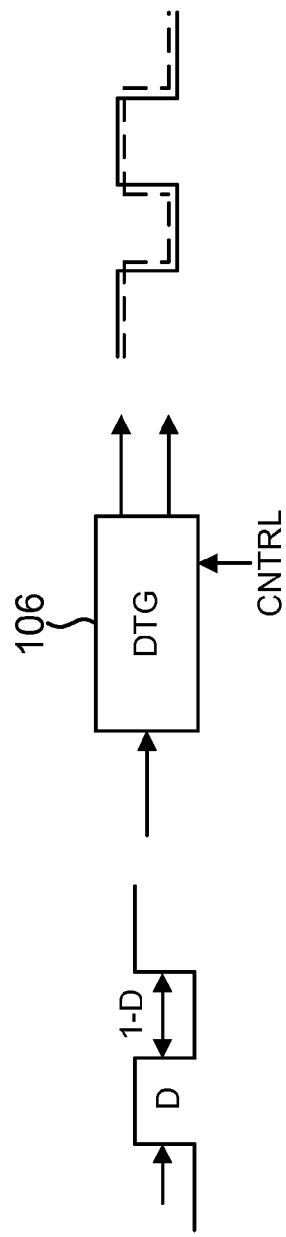
FIG. 3 shows an example dead time generator for use in some embodiments.

FIG. 3 shows an example dead time generator 106 for use in some embodiments. Dead time generator 106 receives a PWM signal as an input and outputs two control signals that are phase shifted in a way that provides dead time (time during which both S0 and S1 are off) in the switching of S0 and S1. The dead time is long enough that there is no time period where S0 and S1 are both on at the same time but short enough to minimize or eliminate body diode power loss.

On the left-hand side of dead time generator 106 is illustrated an example PWM signal that would be received by dead time generator 106 in some embodiments. On the right-hand side of dead time generator 106 is illustrated two control signals that are output by dead time generator 106. A first one of the control signals is represented by a dashed line, and the second control signal is represented by a solid line. In the example of FIG. 2, the first control signal (in dashed line) is fed to the gate of PMOS switch S0, and the second control signal (in solid line) is fed to the gate of NMOS switch S1. When both of the control signals are high, switch S0 is off and switch S1 is on; when both of the control signals are low, switch S0 is on and switch S1 is off.

Of note in FIG. 3 is that the PWM signal is a square wave with a duty cycle represented by a fraction D. The first and second control signals output from dead time generator 106 are slightly modified versions of the PWM signal and have a same or similar duty cycle. The control input (CNTRL) of dead time generator 106 allows the value of the dead time to be programmatically set, as described in more detail below.

Figure 4:
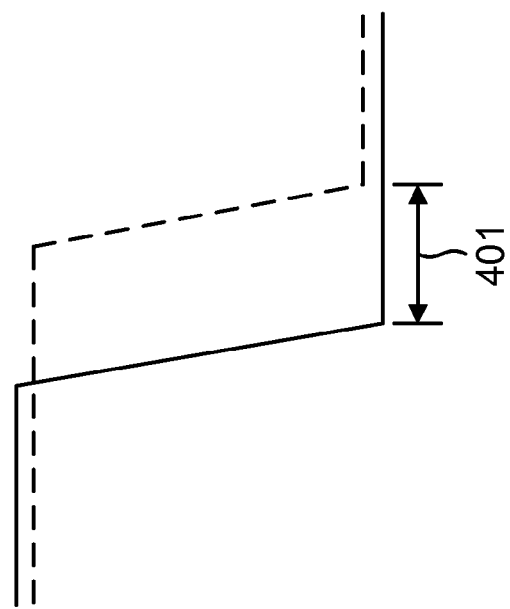
FIG. 4 is an illustration of the falling edges of the first and second control signals of FIG. 3 according to one embodiment.

FIG. 4 is an illustration of the falling edges of the first and second control signals of FIG. 3 according to some embodiments. The magnitude of both the solid line signal and the dashed line signal are typically the same, but are shown offset from each other in FIG. 4 in order to distinguish the dashed line signal from the solid line signal. FIG. 4 is a magnified excerpt of the first and second control signals of FIG. 3 marked to show phase difference 401 (also referred to as "dead time"). Dead time 401 may be expressed in terms of time, so that in some embodiments a range of dead time may be between 50 and 500 ps, although the scope of embodiments is not limited to any specific value for dead time. If dead time 401 is small, then the synchronous buck converter 110 may experience shoot-through. On the other hand, if dead time 401 is large, then the synchronous buck converter 110 may experience body diode power loss. However, there exists in this embodiment, a value for dead time 401 that minimizes power loss for the synchronous buck converter 110.

In the feedback system 100 of FIG. 1, power losses within the system are compensated for by an increase in the duty cycle of the PWM signal by virtue of the feedback loop keeping Voutput at a nearly constant level. Thus, power losses attributable to either shoot-through or body diode power loss in the buck converter 110 result in a larger duty cycle of the PWM signal. Various embodiments identify an optimal value for dead time 401 by identifying a minimum duty cycle for a given load.

FIG. 5 is an illustration of an example system 500 for setting dead time at a desired value, according to one embodiment. Example system 500 is a modified version of the system 100 of FIG. 1, in which a control feedback loop is added to adjust the dead time. The larger control feedback loop, which adjusts the PWM signal in order to keep Voutput nearly constant, operates the same as described above with respect to FIG. 1. The system of FIG. 5 further includes a PWM measurement circuit 510 and control logic 520 to programmatically adjust the dead time setting at dead time generator 106.

In one example embodiment, system 500 assumes that the load 114 is constant. Of course, in real world systems load 114 may not stay constant. However, for relatively short periods of time the system assumes that the load 114 is constant so that a minimum PWM signal can be identified for that load. As the larger feedback loop operates, PWM measurement circuit 510 measures the duty cycle of the PWM signal. In one example embodiment, PWM measurement circuit 510 may include a Delay Lock Loop (DLL) that has a multitude of taps with a resolution small enough to precisely measure the duty cycle of the PWM signal. For instance, in a system where the dead time may range between 50 and 500 ps, a suitable level of precision may be 5 to 10 ps with a DLL having 32 or more taps. However, the scope of embodiments is not limited to a DLL, as any appropriate circuit operable to measure a PWM signal may be used in other embodiments.

PWM measurement circuit 510 measures the duty cycle of the PWM signal and passes that input to logic circuit 520. Logic circuit 520 notes the measured value with respect to a dead time setting used by dead time generator 106. Logic circuit 520 then uses the control input to increment the dead time setting and once the control loop settles, the logic circuit 520 receives another measurement of the PWM signal from circuit 510. Logic circuit 520 then notes the measured value with respect to that dead time setting. Logic circuit 520 repeats this process multiple times and correlates PWM measurements with a series of dead time value settings. In one example, logic circuit 520 may build a table that correlates the PWM measurements with respective dead time settings.

After logic circuit 520 has correlated multiple dead time settings with their respective PWM measurements, logic circuit 520 may identify a dead time setting having a minimum corresponding PWM measurement. Logic circuit 520 then uses the control input to cause dead time generator 106 to use that identified dead time setting in order to minimize power loss at the buck converter 110. Of course, load 114 may vary over time, thereby making recalibration of the dead time generator 106 desirable. Accordingly, control logic 520 repeats this process either on a periodic basis or as needed to identify desired dead time settings and to apply those desired dead time settings to minimize power loss. In this way, PWM measurement circuit 510 and control logic 520 act as another feedback control loop to adjust dead time values to reduce loss throughout operation of the system 500.

Figure 6:
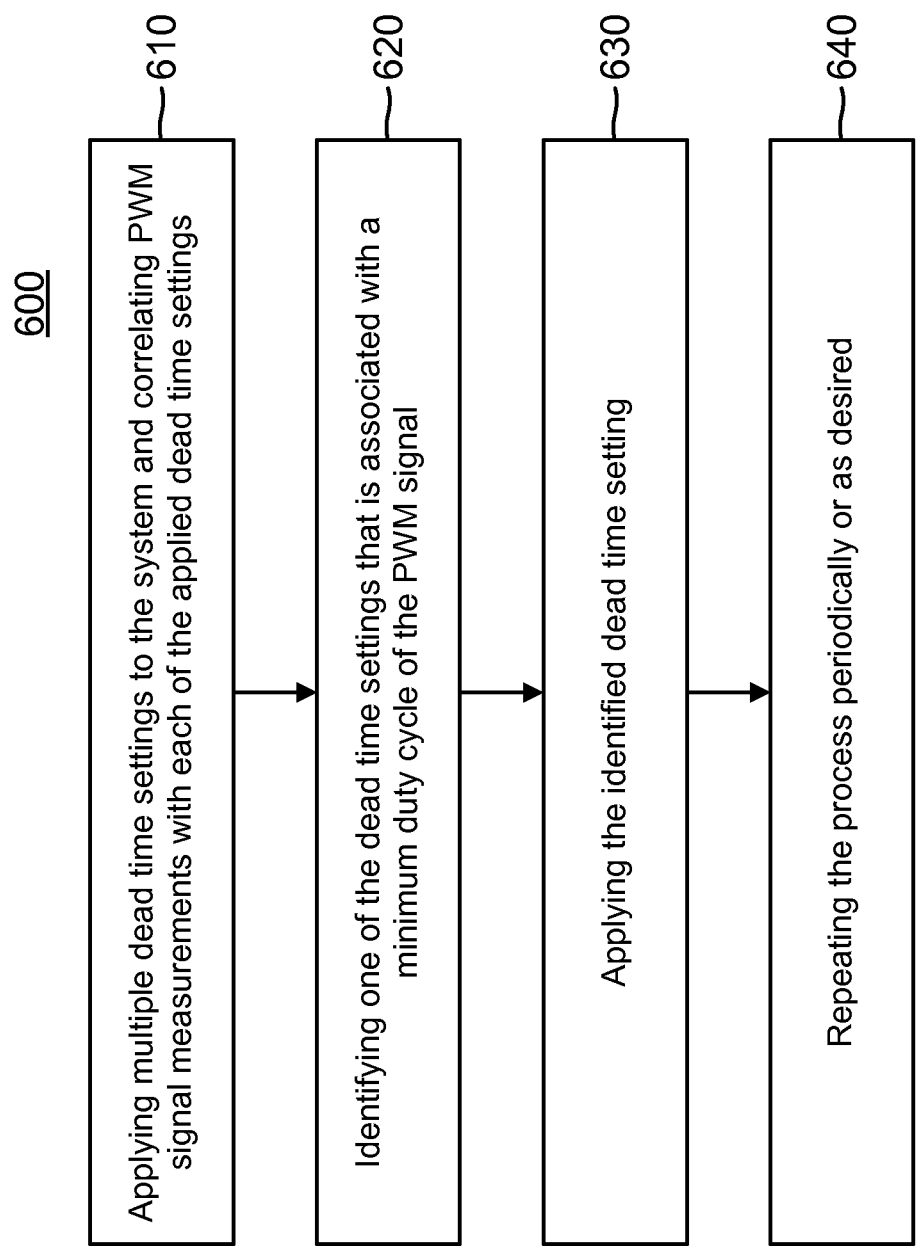
FIG. 6 is an illustration of a flow diagram of an example method of selecting and applying a dead time, according to one embodiment.

A flow diagram of an example method 600 of selecting and applying a desired dead time is illustrated in FIG. 6. In one example, method 600 is performed by a logic circuit, such as logic circuit 520 of FIG. 5, to minimize a duty cycle of signals applied to switches in a synchronous buck converter. Method 600 is performed in a system, such as system 500 of FIG. 5, which includes a feedback loop and a synchronous buck converter with an output held at a nearly constant voltage. The buck converter is controlled indirectly by a PWM signal, where adjustments in the duty cycle of the PWM signal cause the buck converter to either lower or raise the output voltage. The PWM signal is converted into two control signals having a phase difference that defines a dead time of the switches in the synchronous buck converter.

At action 610, the logic circuit applies multiple dead time settings to the system and correlates PWM signal measurements with each of the applied dead time settings. In some embodiments, the logic circuit saves the PWM signal measurements and their associated dead time settings in a table or other appropriate data structure.

At action 620, the logic circuit identifies one of the dead time settings that is associated with a minimum duty cycle of the PWM signal. In an example wherein PWM signal measurements of their associated dead time settings are in a table, action 620 include searching the table for a minimum PWM signal measurement and identifying the dead time setting associated with that minimum PWM signal measurement.

At action 630, the logic circuit applies the identified dead time setting. In the example of FIG. 5, the logic circuit 520 uses the control input to the dead time generator 106 to instruct the dead time generator 106 to apply the identified setting.

At action 640, the logic circuit repeats that process of actions 610 through 630 periodically or as desired. For instance, changes in temperature of the circuit or of the associated load may change the behavior of the feedback loop so that a particular dead time setting may not be optimal. Accordingly, action 640 provides for recalibration so that optimal dead time settings are identified and applied on an ongoing basis as the buck converter operates.

The scope of embodiments is not limited to the specific method shown in FIG. 6. Other embodiments may add, omit, rearrange, or modify one or more actions. For instance, method 600 may be part of a larger feedback operation that holds the buck converter at the nearly constant value (the larger feedback operation is described in more detail above with respect to FIG. 1).

The embodiments described above monitor PWM duty cycle and adjust dead time settings to minimize PWM duty cycle to increase efficiency. However, the scope of embodiments is not limited to adjusting dead time settings only. Rather, PWM duty cycle measurements can be used to optimize parameters other than dead time in order to increase efficiency in circuits such as the circuit of FIG. 1. For instance, in systems using buck converters that have multiple parallel legs of transistors, PWM duty cycle measurements can be correlated with different numbers of active parallel legs so that a minimum duty cycle can be achieved by identifying the number of active parallel legs associated with a minimum PWM duty cycle. Similarly, in systems having buck converters with multiple phases, PWM duty cycle measurements can be correlated with different numbers of active phases so that a minimum duty cycle can be achieved by identifying a number of active phases associated with the minimum PWM duty cycle. In other words, when PWM duty cycle is used as an indication of efficiency, any appropriate phenomenon or parameter in the feedback loop system may be correlated with a minimum value of PWM duty cycle in order to increase efficiency.

The PWM duty cycle can also be used as a crude measure of current sense because the conversion ratio is the ratio of supply voltage to output voltage. A look up table (or calculation) can convert the theoretical values and the technique described can measure the difference from the theoretical value and the measured value, the additional pulse width directly correlates to the load current. This approach can be used in very high speed applications for phase dropping and leg shedding.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

Figure 7:
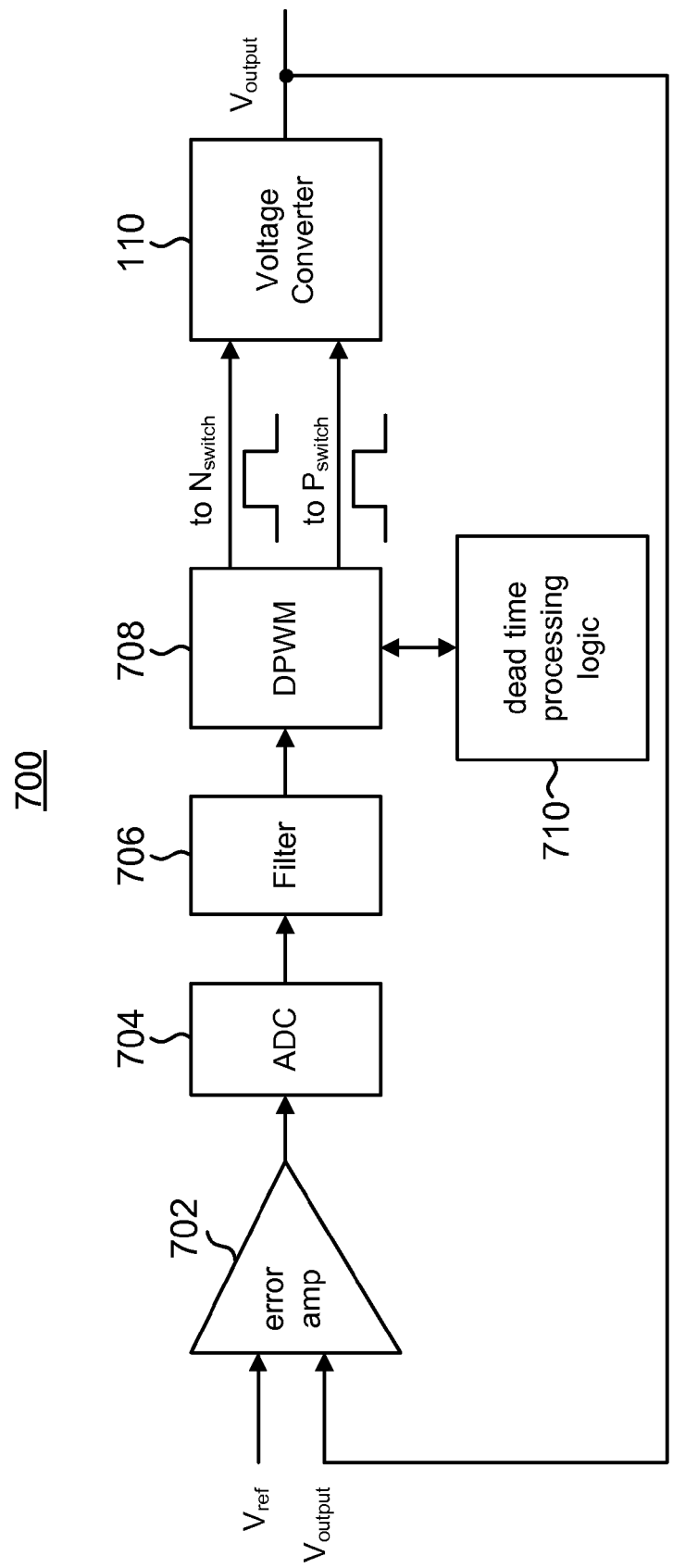
FIG. 7 shows another example system providing control of dead time according to one embodiment.

FIG. 7 shows another embodiment of a system 700 providing control of dead time according to the principles discussed above. The error amplifier receives the reference voltage Vref and the output voltage Voutput and outputs an analog signal indicating the difference (the error) between those voltages. The analog to digital converter (ADC) 704 receives the analog error signal and creates a digital error signal. The phase filter 706 receives the digital error signal. An example of the phase filter 706 may include a finite impulse response filter or a Proportional Integral Derivative (PID) controller/compensator. The role of the phase filter 706 is to prevent unwanted positive feedback within the digital control system of FIG. 7. The output of the phase filter 706 is a digital code that is indicative of a duty cycle to be implemented by the Digital Pulse Width Modulator (DPWM) 708. The DPWM 708 is explained in more detail below with respect to FIG. 8. In short, the DPWM 708 outputs pulse width modulation (PWM) signals to the NMOS switch (S1) and the PMOS switch (S0) of the buck converter 110. The phase difference between the NMOS switch and the PMOS switch defines the dead time—this is explained in more detail above at FIGS. 3 and 4.

Dead time processing logic 710 is in communication with DPWM 708 to observe the dead time settings and the associated DPWM duty cycles. Dead time processing logic 710 creates a table or other data structure that matches dead time values with their corresponding duty cycle values. The lower the duty cycle, the more efficient the operation of the buck converter 110. Therefore, the dead time value that corresponds with the lowest PWM duty cycle may be regarded as the most efficient choice of dead time settings. Dead time processing logic 708 creates this table or other data structure and includes logic to parse the table, identify the dead time setting associated with the lowest duty cycle value, and apply that dead time setting at DPWM. Dead time processing logic 710 may be embodied as software and/or hardware and in some embodiments may be implemented as a microcontroller or other suitable digital control circuit. Operation of dead time processing logic 710 is discussed in more detail below after the description of FIG. 8.

Figure 8:
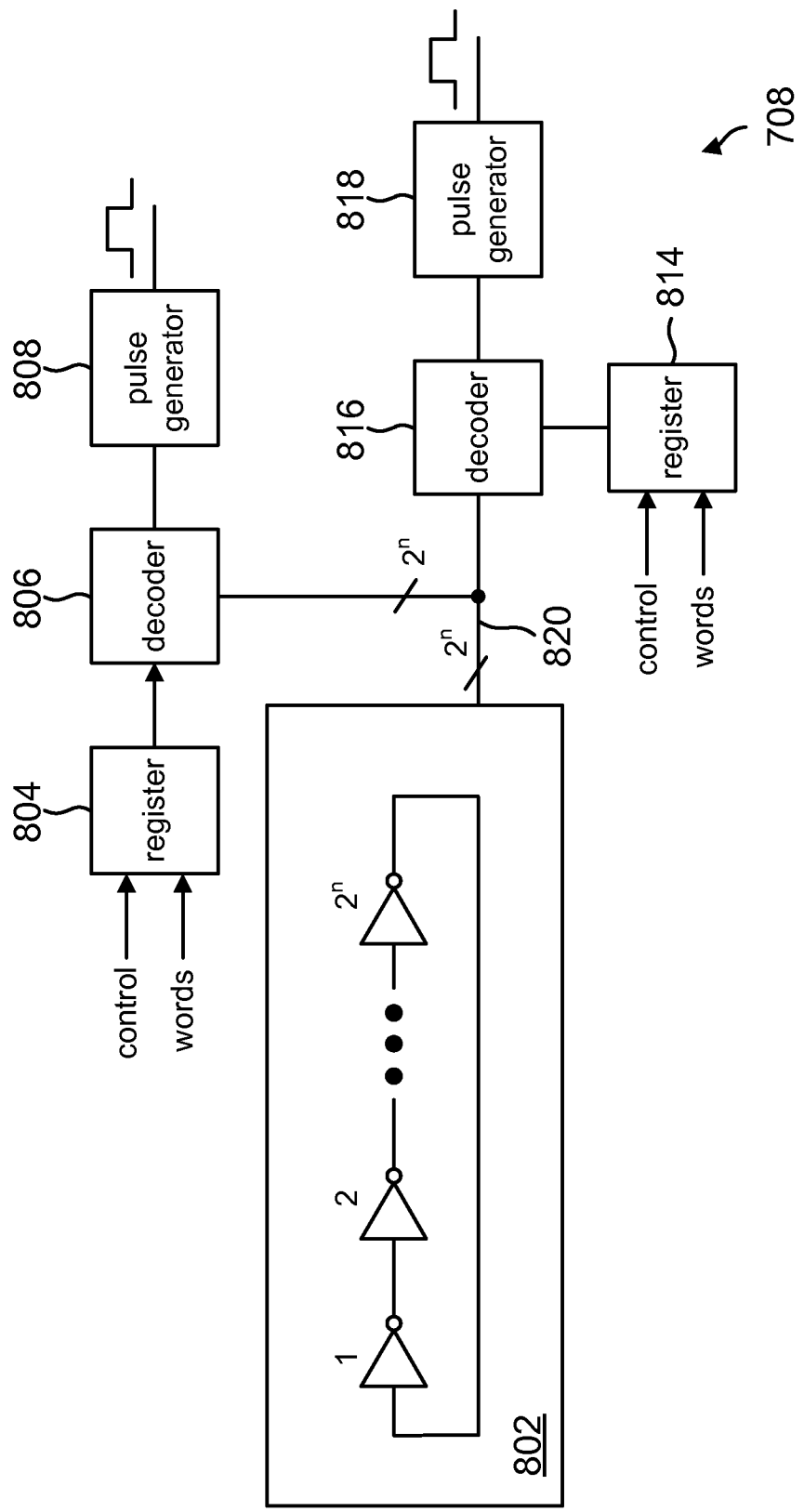
FIG. 8 shows one example circuit implementation of a Digital Pulse Width Modulator (DPWM) that can be used in various embodiments, such as the embodiment of FIG. 7.

FIG. 8 shows one example circuit implementation of DPWM 708 of FIG. 7 using a Delay Locked Loop (DLL) architecture. DPWM 708 includes a ring oscillator 802, which includes a multitude of inverters arranged in series and in a ring, where the inverters are labeled 1, 2, ... 2'. In other words, in this example embodiment there are $2^n$ inverters in ring oscillator 802, and a corresponding number $2^n$ of taps 820. In one example, each of the taps includes an output between one inverter and the next. A digital one (high) signal propagates around the ring oscillator 802, and it appears at a given tap once per cycle around the ring oscillator 802. The digital one can be sensed by selecting a given tap. Furthermore, the time it takes for the digital one to cycle around the ring oscillator 802 is largely dependent on the number $2^n$ of inverters in the ring oscillator 802.

The number $2^n$ of inverters and taps 820 may be selected to be appropriate for a given application. For instance, in an embodiment in which the PWM signal is a 200 MHz signal, each cycle of the PWM signal may be 5 ns. If each individual inverter corresponds to about 10 ps, the number of inverters should be approximately 500 in order to generate an entire waveform. Therefore, n may be set to 9 ($2^9$ is 512). However, the scope of embodiments is not limited to any specific frequency for the PWM signal, nor any specific number of inverters and taps 820.

As noted above, systems including dead time have two PWM signals that are offset from one another, where the offset in time defines the dead time. Accordingly, DPWM 708 of FIG. 8 includes circuitry to generate the two PWM signals independently of each other, where the two PWM signals correspond to the two control signals of FIGS. 3 and 4. In this example, the circuitry that includes items 804, 806, 808 provides a PWM signal to drive the NMOS switch (S1) and the circuitry that includes items 814, 816, and 818 provides another PWM signal to drive the PMOS switch (S0).

Furthermore, in the present example, the DPWM 708 uses a single ring oscillator 802 but also uses different decoder circuits 806, 816. Since both decoder circuits 806, 816 interface with a single ring oscillator 802, synchronization is maintained in the different PWM signals that are output to the PMOS switch and the NMOS switch.

Each of the decoders 806, 816 are independently programmable. Focusing on the PWM signal for the NMOS switch first, DPWM 708 includes registers 804 for a falling edge and a rising edge. During normal operation, the digital error signal (after it passes through the filter 706) is a string of bits that identifies a tap in the ring oscillator 802. For example, one string of bits in the registers 804 identifies a tap for the falling edge, and another string of bits in the registers 804 identifies a tap for the rising edge. Decoder 806 reads the strings of bits from registers 804 and selects a tap identified by those bits, thereby coupling the oscillating signal within ring oscillator 802 with the pulse generator 808. In this way, the rising edge and falling edge are identified, thereby defining the duty cycle of the square wave that is output to the NMOS switch from pulse generator 808. The strings of bits are entered into registers 804 by filter 706 during normal operation and are entered into registers 804 by dead time processing logic 710 during the dead time setting process.

Now focusing on the PWM signal for the PMOS switch, items 814, 816, 818 operates similarly to items 804, 806, 808 described above. Specifically, either dead time processing logic 710 or filter 706 enters strings of bits into registers 814, where the strings of bits identify a rising edge and a falling edge, thereby defining the duty cycle. Decoder 816 reads the bits from registers 814 and selects two of the taps to couple to pulse generator 818. Pulse generators 808, 818 include amplifiers, buffers, or other appropriate circuitry to generate their respective PWM signals at an appropriate voltage level. Decoders 806, 816 may include arrangements of AND gates or multiplexers operable to select a given tap from a binary string input.

Taking a simple example, the ring oscillator 802 may include 16 taps 820. Accordingly, each one of the string of bits includes four bits, so that each tap may be identified uniquely. However, the scope of embodiments is not limited to any specific number of taps nor any lengths of strings of bits, and as more taps are included in an application, longer strings of bits may be used to identify the taps. For instance, in an embodiment with approximately 500 taps, each string may be nine bits long.

The dead time may be defined by offsetting the taps that are selected by decoder 806 relative to the taps that are selected by decoder 816. If the registers 804 have the same bit strings as the registers 814, then the PWM signals have zero phase difference, and dead time is zero. In an example where an acceptable dead time is 50 ps, and where each tap corresponds to 10 ps, an offset of five taps provides the dead time value. Of course, an acceptable dead time may be device-dependent, and further may be determined by the algorithm described above to minimize losses due to shoot through or body diode loss.

Referring to FIG. 7 again, dead time processing logic 710 may perform the actions 620-640 of FIG. 6 by identifying a dead time setting with a minimum duty cycle of the PWM signals and applying the dead time setting to DPWM 708.

An example process starts by setting a particular duty cycle and setting a particular dead time. For instance, the duty cycle may be set to 50%, and the dead time may be set to 50 ps. Dead time processing logic 710 sets these values by providing strings of bits to the registers 804, 814 to define the duty cycle and the dead time. Error amplifier 702 detects the error between Vref and Voutput, and that error signal propagates through the control loop, is digitized by ADC 704, and is passed to filter 706, which adjusts the duty cycle up or down by applying control words to the registers of DPWM 708. The outer control loop holds Voutput substantially constant as DPWM 708 applies PWM signals to voltage converter 110, and after some amount of time the outer control loop settles. The dead time processing logic 710 may then observe the PWM duty cycle by reading the values of the registers 804 and 814, which indicate the duty cycle.

The dead time processing logic 710 then creates an entry in the table or other data structure that correlates that specific dead time value with the observed duty cycle. The dead time processing logic 710 then adjusts the dead time (e.g., 40 ps or 60 ps), lets the system settle, then observes the new PWM duty cycle. The dead time processing logic 710 repeats this process multiple times to develop multiple entries in the table so that a most efficient value of dead time may be identified.

The scope of embodiments includes any number of iterations to adjust the dead time and correlate the dead time value with an observed DPWM duty cycle. After the dead time processing logic 710 gathers the data, it then parses the table to identify the value for dead time that corresponds to the lowest PWM duty cycle. The dead time processing logic 710 may then apply that value of dead time to the DPWM 708 by entering values in the registers 804 and 814 that define the appropriate offset between the two PWM signals.

Once the dead time value has been set by dead time processing logic 710, the system may enter a normal operating mode, where the feedback loop adjusts the duty cycle of the pulse width modulated signals according to the error between the output voltage and the reference voltage. Dead time processing logic 710 maintains the set dead time by maintaining the proper offsets between the strings of digits. In this way, the duty cycle may be adjusted up or down as appropriate by the outer control loop, while maintaining the dead time value that is applied by the dead time processing logic 710. Dead time processing logic 710 may repeat the action 610-630 periodically or as desired. In some example embodiments, the actions described above for dead time processing logic 710 may be implemented as computer executable code saved to a computer readable medium, such as RAM. Dead time processing logic 710 may include processing circuitry that then reads the computer executable code from the computer readable medium and performs the actions described above in accordance with the computer executable code.

The system of FIGS. 7 and 8 may provide various advantages over some conventional systems. For instance, one example conventional phase generator to provide dead time may include a circuit having a P-channel string and an N-channel string, where each string includes a NOR gate serially coupled to one or more inverters. The output of each string is fed back to the NOR gate of the opposite string. The number of inverters in each of the strings determines the dead time, and the more inverters, the longer the dead time. In short, such conventional system applies analog feedback and hysteresis. By contrast, the system of FIGS. 7 and 8 includes a decoder of a ring oscillator, and it is a digital system. Accordingly, various embodiments of FIGS. 7 and 8 may operate more quickly by several orders of magnitude than would a conventional analog feedback and hysteresis system. Various embodiments may provide an advantage by offering high-frequency performance in modern circuits.

What is claimed is:

1. A circuit for increasing efficiency in a voltage conversion system, the circuit comprising:
   a Digital Pulse Width Modulator (DPWM) configured to generate a first control signal and a second control signal;
   a voltage converter configured to receive the first control signal at a first switch and a second control signal at a second switch, wherein the first switch is configured to be on according to the first control signal, and wherein the second switch is configured to be on according to the second control signal, further wherein a phase difference between the first control signal and the second control signal defines a time difference in operation of the first switch and the second switch; and
   a digital control circuit in communication with the DPWM, the digital control circuit configured to control the DPWM to iteratively adjust the phase difference between the first control signal and the second control signal, the control circuit further configured to measure a duty cycle resulting from iteratively adjusting the phase difference, the control circuit further configured to set the phase difference between the first control signal and the second control signal in response to measuring the duty cycle.

2. The circuit of claim 1, wherein the DPWM comprises a pulse generator for the first control signal and a pulse generator for the second control signal.

3. The circuit of claim 1, wherein the DPWM comprises registers to receive binary bit strings from the digital control circuit, the binary bit strings defining the phase difference between the first control signal and the second control signal.

4. The circuit of claim 1, wherein the first control signal and the second control signal comprise pulse width modulated (PWM) signals.

5. The circuit of claim 1, wherein the voltage converter comprises a buck converter, and wherein the first and second switches comprise transistors.

6. The circuit of claim 1, wherein the digital control circuit is configured to measure the duty cycle by reading binary bit strings in registers of the DPWM.

7. The circuit of claim 1, wherein the DPWM comprises:
   a ring oscillator having a plurality of inverters and a plurality of taps; and
   first decoding circuitry configured to select a first subset of the taps to generate the first control signal; and
   second decoding circuitry configured to select a second subset of the taps to generate the second control signal.

8. The circuit of claim 1, further comprising:
   a feedback signal path from a voltage output of the voltage converter to an error amplifier, the error amplifier being configured to adjust the duty cycle in accordance with the voltage output on the feedback signal path.

9. The circuit of claim 1, wherein the DPWM comprises a Delay Locked Loop (DLL).

10. A method for efficiently using power at a voltage converter, the method comprising:
    producing a first pulse width modulated (PWM) signal and a second pulse width modulated (PWM) signal by a Digital Pulse Width Modulator (DPWM), the first pulse width modulated (PWM) signal and the second pulse width modulated (PWM) signal having an adjustable phase difference relative to each other;
    operating a first switch and a second switch of the voltage converter according to the first PWM signal and the second PWM signal, respectively, within a feedback loop that adjust a duty cycle of the first and second PWM signals according to power losses experienced by the voltage converter;
    iteratively adjusting the phase difference and correlating a plurality of measurements of the duty cycle with adjustments of the phase difference;
    determining a setting of the phase difference that is correlated with a particular one of the measurements of the duty cycle; and
    producing the first PWM signal and the second PWM signal according to the setting of the phase difference.

11. The method of claim 10, wherein the particular one of the measurements of the duty cycle is a minimum measurement of the duty cycle.

12. The method of claim 10, further comprising:
    creating a data structure having a plurality of entries, each of the entries including one of the measurements of the duty cycle and an associated phase difference.

13. The method of claim 12, wherein determining the setting of the phase difference that is correlated with the particular one of the measurements of the duty cycle comprises:
    parsing the data structure to determine an entry with a lowest duty cycle value within the data structure.

14. The method of claim 10, wherein iteratively adjusting the phase difference comprises:
    entering bit strings into a plurality of registers of the DPWM, the bit strings defining rising and falling edges of the first and second PWM signals.

15. The method of claim 10, wherein the voltage converter comprises a buck converter.

16. The method of claim 10, wherein the phase difference defines a timing difference in operation of the first switch and the second switch.

17. The method of claim 10, further comprising holding an output voltage of the voltage converter substantially constant during iteratively adjusting the phase difference.

18. The method of claim 10, wherein rising and falling edges of the first and second PWM signals are defined by decoding circuitry of the DPWM selecting a plurality of taps of a delay locked loop (DLL) of the DPWM.

19. The method of claim 10, wherein producing the first PWM signal and the second PWM signal according to the setting of the phase difference is performed in the feedback loop, wherein the feedback loop maintains a substantially constant voltage output of the voltage converter.

20. A system for efficiently using power during a voltage conversion, the system comprising:
   means for generating a first control signal and a second control signal using a delay locked loop (DLL), the first control signal and the second control signal having a phase difference;
   means for converting an input voltage to an output voltage in accordance with a duty cycle of the first and second control signals, the means for converting being configured to receive the first control signal at a first switch and a second control signal at a second switch, wherein the first switch is configured to be on according to the first control signal, and wherein the second switch is configured to be on according to the second control signal; and
   means for controlling the generating means to iteratively adjust the phase difference, the means for controlling the generating means further configured to measure a duty cycle resulting from iteratively adjusting the phase difference and to set the phase difference in response to measuring the duty cycle.

21. The system of claim 20, wherein the phase defines a time difference in operation of the first switch and the second switch.

22. The system of claim 20, wherein the generating means comprises a Digital Pulse Width Modulator (DPWM).

23. The system of claim 22, wherein the DPWM comprises decoder circuitry having a plurality of multiplexers to select taps in a Delay Locked Loop (DLL).

24. The system of claim 20, wherein the means for controlling comprises a microcontroller.

25. The system of claim 20, wherein the means for converting an input voltage to an output voltage comprises a buck converter.

26. A computer program product having a computer readable medium tangibly recording computer program logic for efficiently using power during a voltage conversion the computer program product comprising:
   code to produce a first pulse width modulated (PWM) signal and a second pulse width modulated (PWM) signal by a Digital Pulse Width Modulator (DPWM), the first pulse width modulated (PWM) signal and the second pulse width modulated (PWM) signal being output to a first switch and a second switch of a voltage converter, respectively;
   code to iteratively adjust a phase difference between the first PWM signal and the second PWM signal and to correlate a plurality of measurements of a duty cycle of the first PWM signal and the second PWM signal with adjustments of the phase difference;
   code to determine a setting of the phase difference that is correlated with a particular one of the measurements of the duty cycle; and
   code to produce the first PWM signal and the second PWM signal according to the setting of the phase difference.

27. The computer program product of claim 26, wherein the particular one of the measurements of the duty cycle is a minimum measurement of the duty cycle.

28. The computer program product of claim 26, further comprising:
   code to create a data structure having a plurality of entries, each of the entries including one of the measurements of the duty cycle and an associated phase difference.

29. The computer program product of claim 28, wherein the code to determine the setting of the phase difference comprises:
   code to parse the data structure to determine an entry with a lowest duty cycle value within the data structure.

30. The computer program product of claim 26, wherein the code to iteratively adjust the phase difference comprises:
   code to enter bit strings into a plurality of registers of the DPWM, the bit strings defining rising and falling edges of the first and second PWM signals.

* * * * *